United States Patent
Li et al.

(10) Patent No.: US 11,926,699 B2
(45) Date of Patent: Mar. 12, 2024

(54) ALIPHATIC POLYESTER COMPOSITION (71) Applicant: CHANG CHUN PLASTICS CO., LTD., Taipei (TW)

(72) Inventors: Jie-Cheng Li, Taipei (TW); Te-Shun Lin, Taipei (TW)

(73) Assignee: CHANG CHUN PLASTICS CO., LTD., Taipei (TW)

(*) Notice: Subject to any disclaimer, the term of this patent is extended or adjusted under 35 U.S.C. 154(b) by 115 days.

(21) Appl. No.: 17/577,514

(22) Filed: Jan. 18, 2022

(65) Prior Publication Data
US 2023/0183420 A1 Jun. 15, 2023

(30) Foreign Application Priority Data

Dec. 10, 2021 (CN) .......................... 202111508210.8
Dec. 10, 2021 (TW) ................................. 110146326

(51) Int. Cl.
*C08G 63/16* (2006.01)
(52) U.S. Cl.
CPC ......... *C08G 63/16* (2013.01); *C08G 2230/00* (2013.01)
(58) Field of Classification Search
USPC ....................................................... 528/272
See application file for complete search history.

(56) References Cited

FOREIGN PATENT DOCUMENTS

| CN | 101134809 A | 3/2008 |
|---|---|---|
| CN | 101 885902 A | 11/2010 |
| CN | 104039865 A | 9/2014 |
| CN | 105061744 A | 11/2015 |
| CN | 111372971 A | 7/2020 |
| CN | 112280011 A | 1/2021 |
| CN | 113234210 A | 8/2021 |
| CN | 113512182 A | 10/2021 |
| JP | H09057849 A | 3/1997 |
| JP | 2006328379 A | 12/2006 |
| JP | 2011122144 A | 6/2011 |
| JP | 2022-146911 A | 10/2022 |
| WO | WO-2006043378 A1 * | 4/2006 ............. C08L 59/00 |

OTHER PUBLICATIONS

WO 2006043378 A1 Machine Translation (Year: 2006).*
Examination Report of CNA202111508210.8, (dated Jan. 13, 2023), 7 pages with its English translation.
Examination Report of JPA2022026061, (dated Feb. 7, 2023), 5 pages with its English translation.
An Office Action in corresponding JP Application No. 2022026061 dated Jun. 13, 2023 is attached, 4 pages.
Decision of Refusal of JP2022026061, (dated Dec. 19, 2023).
Decision of Refusal of CN202111508210.8, (dated Oct. 31, 2023).

* cited by examiner

*Primary Examiner* — Terressa Boykin
(74) *Attorney, Agent, or Firm* — Muncy, Geissler, Olds & Lowe, P.C.

(57) ABSTRACT

Provided is an aliphatic polyester composition. The aliphatic polyester composition comprises a polybutylene succinate, wherein the proton nuclear magnetic resonance of the aliphatic polyester composition has a first characteristic peak and a second characteristic peak. The first characteristic peak is located between 3.84 ppm and 4.32 ppm, and the second characteristic peak is located between 5.65 ppm and 5.85 ppm. The integral value of the first characteristic peak is set to be 100 and the integral value of the second characteristic peak is less than 0.10. By controlling the integral value of the second characteristic peak in $H^1$-NMR of the aliphatic polyester composition, the aliphatic polyester composition has good appearance and low concentration of carboxylic acid end group and thereby the product value thereof is increased.

20 Claims, 7 Drawing Sheets

ALIPHATIC POLYESTER COMPOSITION

CROSS-REFERENCE TO RELATED APPLICATION

Pursuant to 35 U.S.C. § 119(a), this application claims the benefits of the priority to Taiwan Patent Application No. 110146326, filed Dec. 10, 2021, and the priority to China Patent Application No. 202111508210.8, filed Dec. 10, 2021. The contents of the prior application are incorporated herein by its entirety.

BACKGROUND OF THE INVENTION

1. Field of the Invention

The instant disclosure relates to an aliphatic polyester composition, more particularly to an aliphatic polyester composition comprising polybutylene succinate.

2. Description of the Prior Arts

Since the industrial revolution, the total production of plastics has been increasing and the plastic wastes have been increasing as well. To solve the pollution problems caused by plastic wastes, biodegradable plastics spring up. Polybutylene succinate (PBS) becomes one of the widely used biodegradable plastics.

Polybutylene succinate is polymerized by succinic acid and butanediol. Polybutylene succinate appears in creamy white and has good impact strength and tearing strength. The main applications are packaging materials, cosmetic containers, and drink bottles. Appearance of aforesaid applications has great influence on marketing. Therefore, the color of polybutylene succinate becomes one of the research topics for one person having ordinary skill in the art.

SUMMARY OF THE INVENTION

In view of this, an objective of the instant disclosure is to improve the color quality of polybutylene succinate and to increase the product value thereof.

Another objective of the instant disclosure is to reduce the concentration of carboxylic acid end group (CEG) of polybutylene succinate.

To achieve the aforementioned objective, the instant disclosure provides an aliphatic polyester composition comprising polybutylene succinate; wherein, the proton nuclear magnetic resonance ($H^1$-NMR) of the aliphatic polyester composition has a first characteristic peak and a second characteristic peak. The first characteristic peak is at 3.84 ppm to 4.32 ppm and the second characteristic peak is at 5.65 ppm to 5.85 ppm. Based on the integral value of the first characteristic peak as 100, the integral value of the second characteristic peak is less than 0.10.

According to the instant disclosure, by controlling the integral value of the second characteristic peak in the $H^1$-NMR of the aliphatic polyester composition, the aliphatic polyester composition of the instant disclosure has nice color and low concentration of carboxylic acid end group, which is beneficial to increasing the product value thereof.

According to the instant disclosure, based on the integral value of the first characteristic peak as 100, the integral value of the second characteristic peak lower than 0.099 is preferable. One person having ordinary skill in the art can understand that the lower integral value of the second characteristic peak indicates the lower content of alkene impurity in the aliphatic polyester composition. In one of the embodiments, based on the integral value of the first characteristic peak as 100, the integral value of the second characteristic peak may be 0.005 to 0.099.

According to the instant disclosure, in addition to the first and second characteristic peaks, the $H^1$-NMR of the aliphatic polyester composition also comprises a third characteristic peak, a fourth characteristic peak, a fifth characteristic peak, and/or a sixth characteristic peak. In one of the embodiments, the third characteristic peak is at 3.30 ppm to 3.42 ppm. Based on the integral value of the first characteristic peak as 100, the integral value of the third characteristic peak may be 0.001 to 2.0. In another embodiment, the fourth characteristic peak is at 3.55 ppm to 3.70 ppm. Based on the integral value of the first characteristic peak as 100, the integral value of the fourth characteristic peak may be 0.01 to 0.50. In further another embodiment, the fifth characteristic peak is at 4.72 ppm to 4.90 ppm. Based on the integral value of the first characteristic peak as 100, the integral value of the fifth characteristic peak may be 0.15 to 0.50. In yet further another embodiment, the sixth characteristic peak is at 4.97 ppm to 5.15 ppm. Based on the integral value of the first characteristic peak as 100, the integral value of the sixth characteristic peak may be less than 0.21 or 0.010 to 0.205.

It should be understood that one person having ordinary skill in the art is able to identify the chemical environments of the proton atoms of components comprised in the aliphatic polyester composition according to their respective chemical shifts of the characteristic peaks. Various starting materials and additives can be added in the aliphatic polyester composition depending on different needs. The polybutylene succinate in the aliphatic polyester composition is represented by Formula (I) below. The aliphatic polyester composition may comprise, but is not limited to, the structures of Formula (II) to Formula (IV).

According to the instant disclosure, the characteristic peaks and the corresponding proton atoms analyzed by the H$^1$-NMR of the aliphatic polyester composition are described below. The first characteristic peak located at 3.84 ppm to 4.32 ppm may correspond to the protons of the —CH$_2$— group besides the ester group in Formula (I), which is labeled as * in Formula (I). The second characteristic peak located at 5.65 ppm to 5.85 ppm may correspond to the proton of the alkene group in Formula (II), which is labeled as 1 in Formula (II). The third characteristic peak located at 3.30 ppm to 3.42 ppm may correspond to the protons of the —CH$_2$— group besides the ether group in Formula (III), which is labeled as * in Formula (III). The fourth characteristic peak located at 3.55 ppm to 3.70 ppm may correspond to the protons of the —CH$_2$— group besides the hydroxy group in Formula (IV), which is labeled as * in Formula (IV). The fifth characteristic peak located at 4.72 ppm to 4.90 ppm may correspond to the proton of the amide group (—NH—CO) formed from chain extension reaction of hexamethylene diisocyanate (HDI). The sixth characteristic peak located at 4.97 ppm to 5.15 ppm may correspond to the protons of the alkene group, which is labeled as 2 in Formula (II).

It should be understood that the alkene impurity is not limited as the above structure of Formula (II). The alkene impurity is the side product yielded by adding acid catalyst or metal catalyst in the reaction. The alkene impurity may be terminal alkene or internal alkene.

It should be understood that the aliphatic polyester composition may comprise trace amount of sulfur and phosphorus. Aforesaid trace amount of sulfur and phosphorus may come from acid catalyst, aliphatic dibasic acid, aliphatic diol added in the production and/or residual in apparatus. The trace amount of sulfur and phosphorus in aliphatic dibasic acid and aliphatic diol may come from the residual in production or recycling process thereof.

Preferably, the content of sulfur of the aliphatic polyester composition may be less than 100 ppm. More preferably, the content of sulfur of the aliphatic polyester composition may be less than 90 ppm. Even more preferably, the content of sulfur of the aliphatic polyester composition may be less than 80 ppm. Optionally, the content of sulfur of the aliphatic polyester composition may be, but is not limited to, 5 ppm, 10 ppm, 15 ppm, 20 ppm, . . . , ppm, 85 ppm, 90 ppm or 95 ppm. The content of sulfur of the aliphatic polyester composition may fall within the ranges between any two of the above values.

Preferably, the content of phosphorus of the aliphatic polyester composition may be less than 50 ppm. More preferably, the content of phosphorus of the aliphatic polyester composition may be less than 45 ppm. Optionally, the content of phosphorus of the aliphatic polyester composition may be, but is not limited to, 1 ppm, 2 ppm, 3 ppm, 4 ppm, 5 ppm, 6 ppm, 7 ppm, 8 ppm, . . . , 43 ppm or 44 ppm. The content of phosphorus of the aliphatic polyester composition may fall within the ranges between any two of the above values.

Preferably, the content of titanium of the aliphatic polyester composition may be 20 ppm to 100 ppm. Optionally, the content of titanium of the aliphatic polyester composition may be, but is not limited to, 20 ppm, 21 ppm, 22 ppm, 23 ppm, 24 ppm, 25 ppm, 26 ppm, 27 ppm, 28 ppm, . . . , 99 ppm or 100 ppm. The content of titanium of the aliphatic polyester composition may fall within the ranges between any two of the above values.

In one of the embodiments, the melt flow index (MI) of the aliphatic polyester composition may be less than 40.0 g/10 min. Optionally, the melt flow index of the aliphatic polyester composition may be, but is not limited to, 1 g/10 min, 2 g/10 min, 3 g/10 min, 4 g/10 min, 5 g/10 min, 6 g/10 min, 7 g/10 min, 8 g/10 min, 9 g/10 min, 10 g/10 min, . . . , 38 g/10 min or 39 g/10 min. The melt flow index of the aliphatic polyester composition may fall within the ranges between any two of the above values.

In one of the embodiments, the concentration of carboxylic acid end group of the aliphatic polyester composition is less than 30.0 meq COOH/kg. In another embodiment, the concentration of carboxylic acid end group of the aliphatic polyester composition is 10.0 meq COOH/kg to 30.0 meq COOH/kg. In further another embodiment, the concentration of carboxylic acid end group of the aliphatic polyester composition is 15.0 meq COOH/kg to 29.0 meq COOH/kg.

In one of the embodiments, the chromaticity b of the aliphatic polyester composition is less than 15.0. In another embodiment, the chromaticity b of the aliphatic polyester composition is 1.0 to 14.0. In further another embodiment, the chromaticity b of the aliphatic polyester composition is 2.0 to 13.0.

In one of the embodiments, the yellowness index (YI) of the aliphatic polyester composition is less than 30.0. In another embodiment, the yellowness index of the aliphatic polyester composition is 4.0 to 29.0.

DETAILED DESCRIPTION OF THE PREFERRED EMBODIMENTS

Hereinafter, multiple examples are provided to illustrate the implementation of the aliphatic polyester composition of the instant disclosure, while multiple comparative examples are provided as comparison. A person having ordinary skill in the art can easily realize the advantages and effects of the instant disclosure from the following examples and comparative examples. The descriptions proposed herein are just preferable embodiments for the purpose of illustrations only, not intended to limit the scope of the instant disclosure. Various modifications and variations could be made in order to practice or apply the instant disclosure without departing from the spirit and scope of the instant disclosure.

Aliphatic Polyester Composition

Examples 1 to 6 and Comparative Example 1

The starting materials of the aliphatic polyester compositions of Examples 1 to 6 and Comparative Example 1 were succinic acid and butanediol. An acid catalyst was added in aforesaid aliphatic polyester compositions of Examples 1 to 6 and Comparative Example 1. Aforesaid acid catalyst was phosphorous acid, sulfuric acid or the combination thereof. The autoclave used in the production had a stirring device, a nitrogen entrance, a heating device, a temperature sensor and an air vent for pressure reducing. The detailed production of aliphatic polyester compositions of Examples 1 to 6 and Comparative Example 1 were described respectively as follows.

Example 1

First, a mixture of succinic acid (100 parts by weight), butanediol (103 parts by weight) and phosphorous acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of phosphorous acid was 130 ppm.

Then the autoclave was heated to 210±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (tetrabutyl titanate, TBT) was added. The reaction temperature of the condensation autoclave was 230±3° C., the reaction pressure was less than 0.1 kPa, the stirring speed of the stirring device was 68 rpm, and the pre-condensation reaction was conducted for 2 hours to 4 hours. Excess butanediol was continuously removed from the pre-condensation reaction. When the intrinsic viscosity reached 0.9 dL/g to 1.1 dL/g, a pre-condensation product was yielded. Based on the weight of final product, the content of titanium in the titanium catalyst was 89 ppm.

Hexamethylene diisocyanate (HDI) was added to the pre-condensation product under 180° C. to 220° C. The mixture was stirred evenly for 0.5 hour to 1 hour. Then the aliphatic polyester composition of Example 1 was yielded. Granulation of aliphatic polyester composition of Example 1 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.8 dL/g to 2.5 dL/g.

Example 2

First, a mixture of succinic acid (100 parts by weight), butanediol (103 parts by weight) and sulfuric acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of sulfuric acid was 125 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 230±3° C., the reaction pressure was less than 0.1 kPa, the stirring speed of the stirring device was 68 rpm, and the pre-condensation reaction was conducted for 1 hour to 2.5 hours. Excess butanediol was continuously removed from the pre-condensation reaction. When the intrinsic viscosity reached 0.9 dL/g to 1.1 dL/g, a pre-condensation product was yielded. Based on the weight of final product, the content of titanium in the titanium catalyst was 97 ppm.

HDI was added to the pre-condensation product under 180° C. to 220° C. The mixture was stirred evenly for 0.5 hour to 1 hour. Then the aliphatic polyester composition of Example 2 was yielded. Granulation of aliphatic polyester composition of Example 2 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.8 dL/g to 2.5 dL/g.

Example 3

First, a mixture of succinic acid (100 parts by weight), butanediol (103 parts by weight) and phosphorous acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of phosphorous acid was 65 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 228±3° C., the reaction pressure was less than 0.1 kPa, the stirring speed of the stirring device was 68 rpm, and the pre-condensation reaction was conducted for 1.5 hour to 3.5 hours. Excess butanediol was continuously removed from the pre-condensation reaction. When the intrinsic viscosity reached 0.9 dL/g to 1.1 dL/g, a pre-condensation product was yielded. Based on the weight of final product, the content of titanium in the titanium catalyst was 29 ppm.

Hexamethylene diisocyanate (HDI) was added to the pre-condensation product under 180° C. to 220° C. The mixture was stirred evenly for 0.5 hour to 1 hour. Then the aliphatic polyester composition of Example 3 was yielded. Granulation of aliphatic polyester composition of Example 3 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.8 dL/g to 2.5 dL/g.

Example 4

First, a mixture of succinic acid (100 parts by weight), butanediol (103 parts by weight), sulfuric acid and phosphorous acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of sulfuric acid was 200 ppm and the amount of phosphorous acid was 65 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 235±3° C., the reaction pressure was less than 0.1 kPa, the stirring speed of the stirring device was 68 rpm, and the pre-condensation reaction was conducted for 2 hours to 4 hours. Excess butanediol was continuously removed from the pre-condensation reaction. When the intrinsic viscosity reached 0.9 dL/g to 1.1 dL/g, a pre-condensation product was yielded. Based on the weight of final product, the content of titanium in the titanium catalyst was 27 ppm.

HDI was added to the pre-condensation product under 180° C. to 220° C. The mixture was stirred evenly for 0.5 hour to 1 hour. Then the aliphatic polyester composition of Example 4 was yielded. Granulation of aliphatic polyester composition of Example 4 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.2 dL/g to 1.8 dL/g.

Example 5

First, a mixture of succinic acid (100 parts by weight), butanediol (103 parts by weight) and sulfuric acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of sulfuric acid was 200 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 235±3° C., the reaction pressure was less than 0.1 kPa, and the initial stirring speed of the stirring device was 68 rpm. As the viscosity grew up, the stirring speed of the stirring device was set to be 52 rpm or even 32 rpm. The condensation reaction was conducted for 4 hours to 6 hours. Excess butanediol was continuously removed from the condensation reaction. The aliphatic polyester composition of Example 5 was yielded. Based on the weight of final product, the content of titanium in the titanium catalyst was 77 ppm.

Granulation of aliphatic polyester composition of Example 5 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.2 dL/g to 1.8 dL/g.

Example 6

First, a mixture of succinic acid (100 parts by weight), butanediol (103 parts by weight) and sulfuric acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of sulfuric acid was 200 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 220±3° C., the reaction pressure was less than 0.1 kPa, and the initial stirring speed of the stirring device was 68 rpm. As the viscosity grew up, the stirring speed of the stirring device was set to be 52 rpm or even 32 rpm. The condensation reaction was conducted for 6 hours to 7 hours. Excess butanediol was continuously removed from the condensation reaction. The aliphatic polyester composition of Example 6 was yielded. Based on the weight of final product, the content of titanium in the titanium catalyst was 79 ppm.

Granulation of aliphatic polyester composition of Example 6 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.2 dL/g to 1.8 dL/g.

Comparative Example 1

First, a mixture of succinic acid (100 parts by weight), butanediol (103 parts by weight) and sulfuric acid was charged into an autoclave. The pressure of the autoclave was reduced to remove air, and nitrogen was charged into the autoclave to become 1 atmosphere. Aforesaid operation was repeated three times so that the autoclave was full of nitrogen. Based on the weight of final product, the amount of sulfuric acid was 500 ppm.

Then the autoclave was heated to 200±3° C. with stirring speed of 68 rpm. Esterification was conducted under aforesaid temperature. The pressure of esterification was 50 kPa to 100 kPa and the reaction time was 2 hours. The water generated from the esterification was continuously removed while esterification was conducting. Then an esterified product was yielded.

The esterified product was transferred into a condensation autoclave. A titanium catalyst (TBT) was added. The reaction temperature of the condensation autoclave was 240±3° C., the reaction pressure was less than 0.1 kPa, the stirring speed of the stirring device was 68 rpm, and the pre-condensation reaction was conducted for 1 hour to 2.5 hours. Excess butanediol was continuously removed from the pre-condensation reaction. When the intrinsic viscosity reached 0.9 dL/g to 1.1 dL/g, a pre-condensation product was yielded. Based on the weight of final product, the content of titanium in the titanium catalyst was 101 ppm.

HDI was added to the pre-condensation product under 180° C. to 220° C. The mixture was stirred evenly for 0.5 hour to 1 hour. Then the aliphatic polyester composition of Comparative Example 1 was yielded. Granulation of aliphatic polyester composition of Comparative Example 1 was carried out. The aliphatic polyester composition was discharged from the bottom of the condensation autoclave to become strands under 220° C. The strands were immersed into 10° C. water and then cut into pellets. The final product was granular aliphatic polyester composition and the intrinsic viscosity of the aliphatic polyester composition was 1.8 dL/g to 2.5 dL/g.

Test Example 1: Proton Nuclear Magnetic Resonance ($H^1$-NMR)

In this test example, the aliphatic polyester compositions of Examples 1 to 6 and Comparative Example 1 were used as test samples. Nuclear magnetic resonance spectrometer (manufacturer: Bruker, model: Bruker CEGIII 400 MHz) was used for analysis.

In this test example, 30 mg to 60 mg of test sample was placed in a vial and 0.5 mL dry d-chloroform ($CDCl_3$) was added. The vial was placed at room temperature for 2 hours until the sample was dissolved completely. The obtained solution was transferred into a NMR test tube and measured at 25° C.

The chemical shift of d-chloroform was set to be 7.26 ppm in the obtained spectra. The spectra were plotted by Bruker TopSpin 4.0.7. The phase was modified in specific chemical shift section. The chemical shift of 4.07 ppm was set to be a pivot point and zero-order calibration was carried out. The satellite signals generated from $C^{13}$ coupling were set to have the same height. First-order calibration was further carried out to modify the flatness of signals. Last, the baseline was modified vertically to align the signal bottom by coefficient A to avoid integral error.

The components comprised in the aliphatic polyester composition of Examples 1 to 6 and Comparative Example 1 were represented as Formula (I) to Formula (IV) below.

Formula (I)

Formula (II)

Formula (III)

Formula (IV)

Figure 1A:
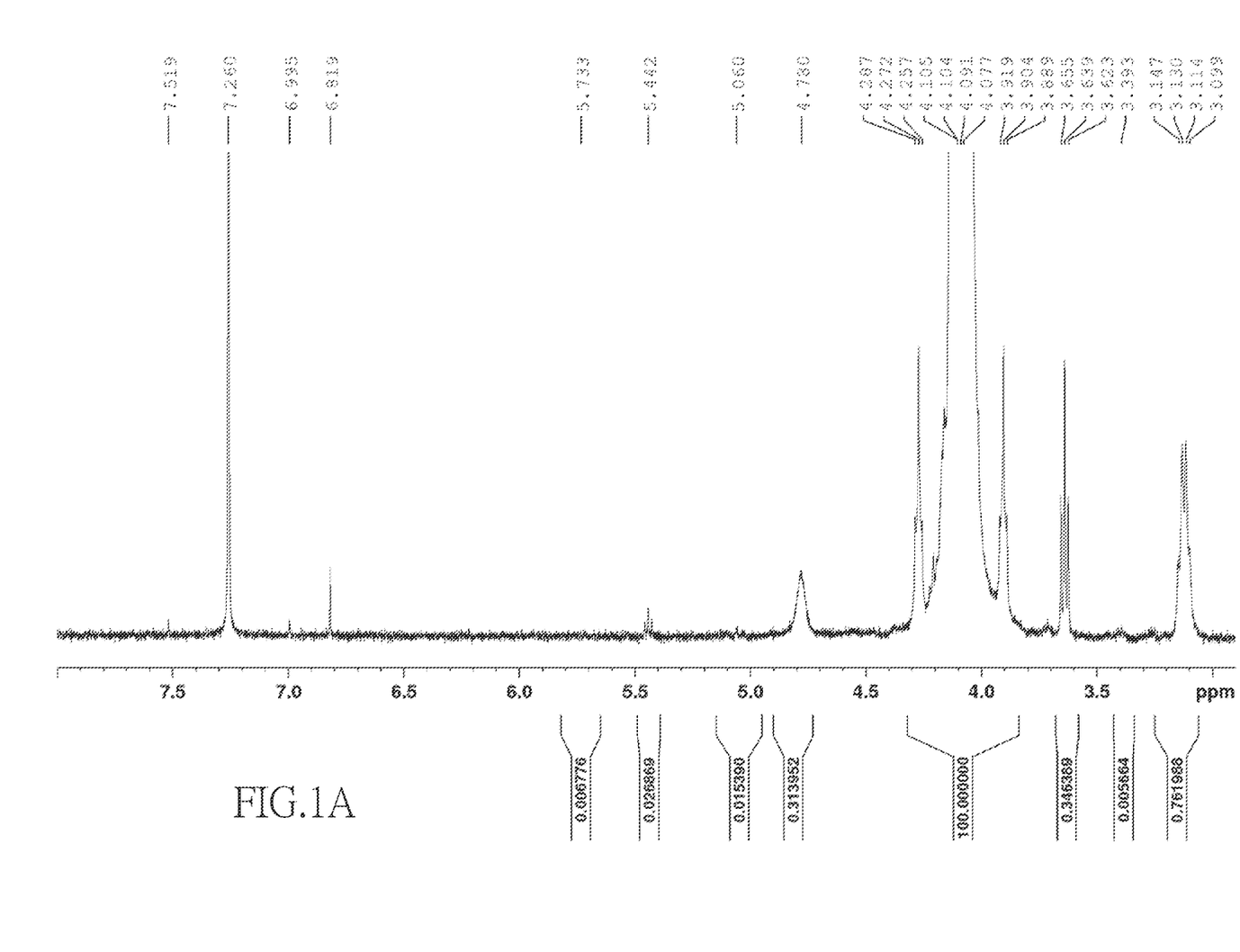
FIG. 1A to FIG. 1G are proton nuclear magnetic resonance (H$^1$-NMR) spectra of aliphatic polyester compositions of Examples 1 to 6 and Comparative Example 1 in order.
Figure 1B:
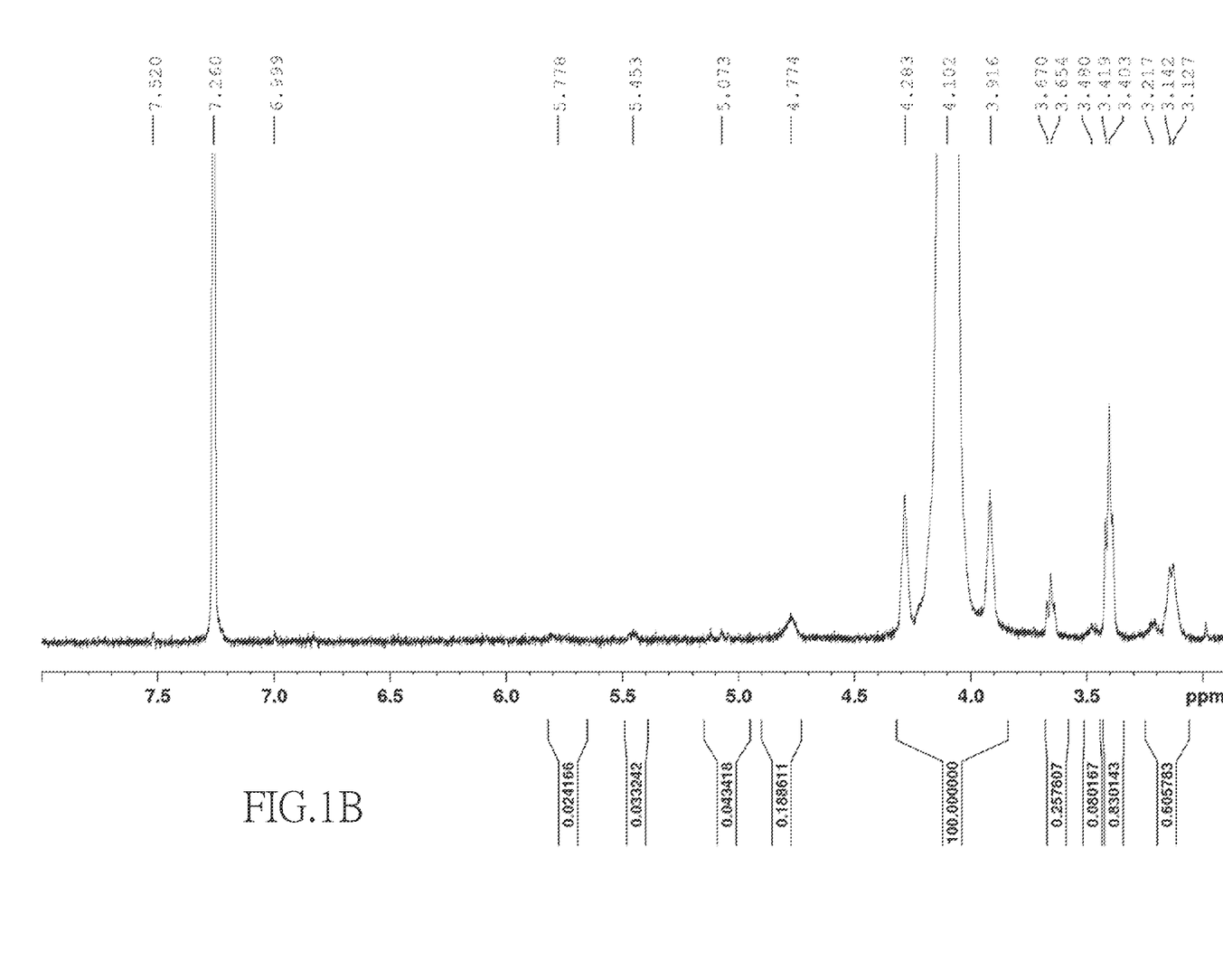
Figure 1C:
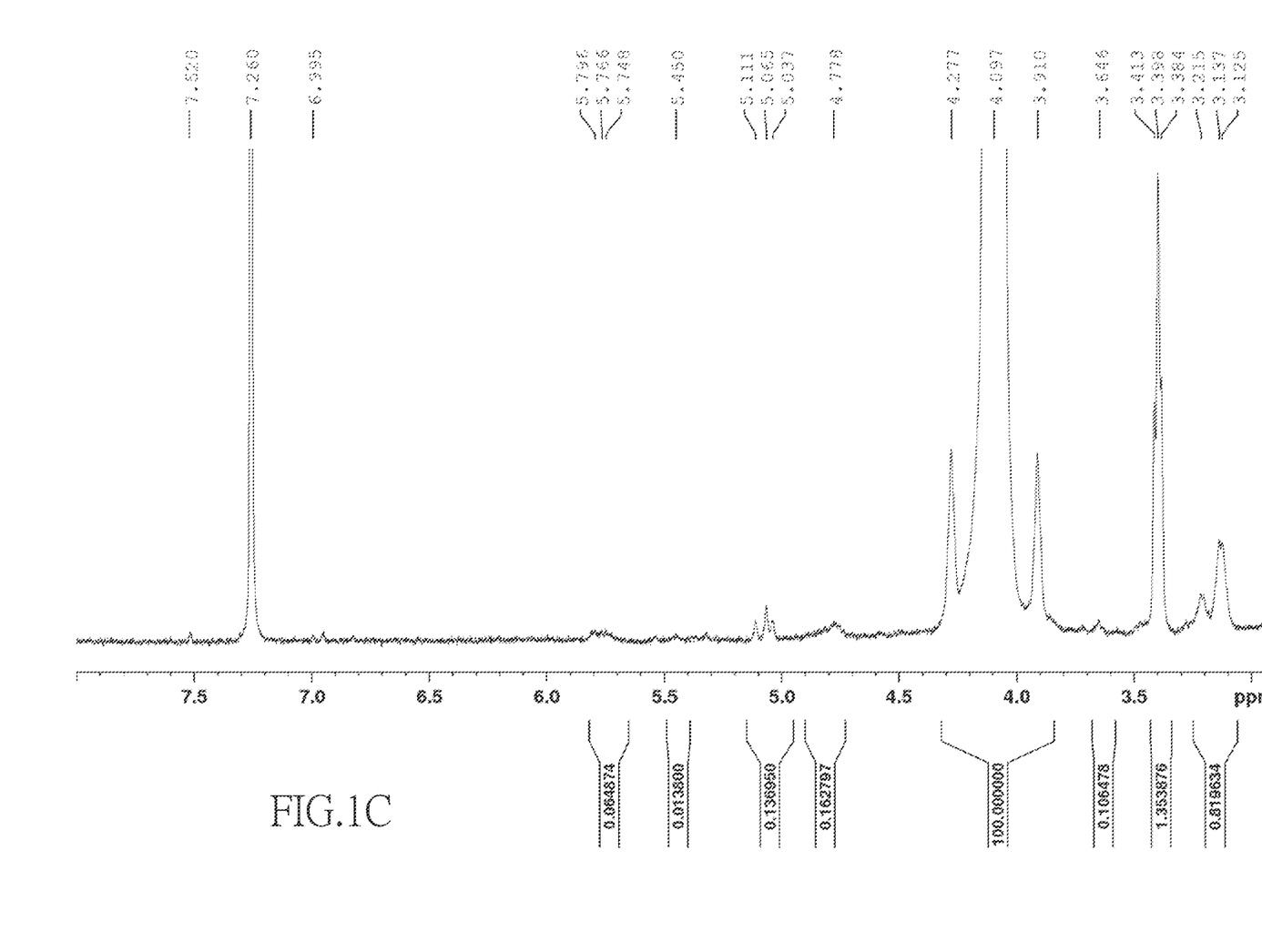
Figure 1D:
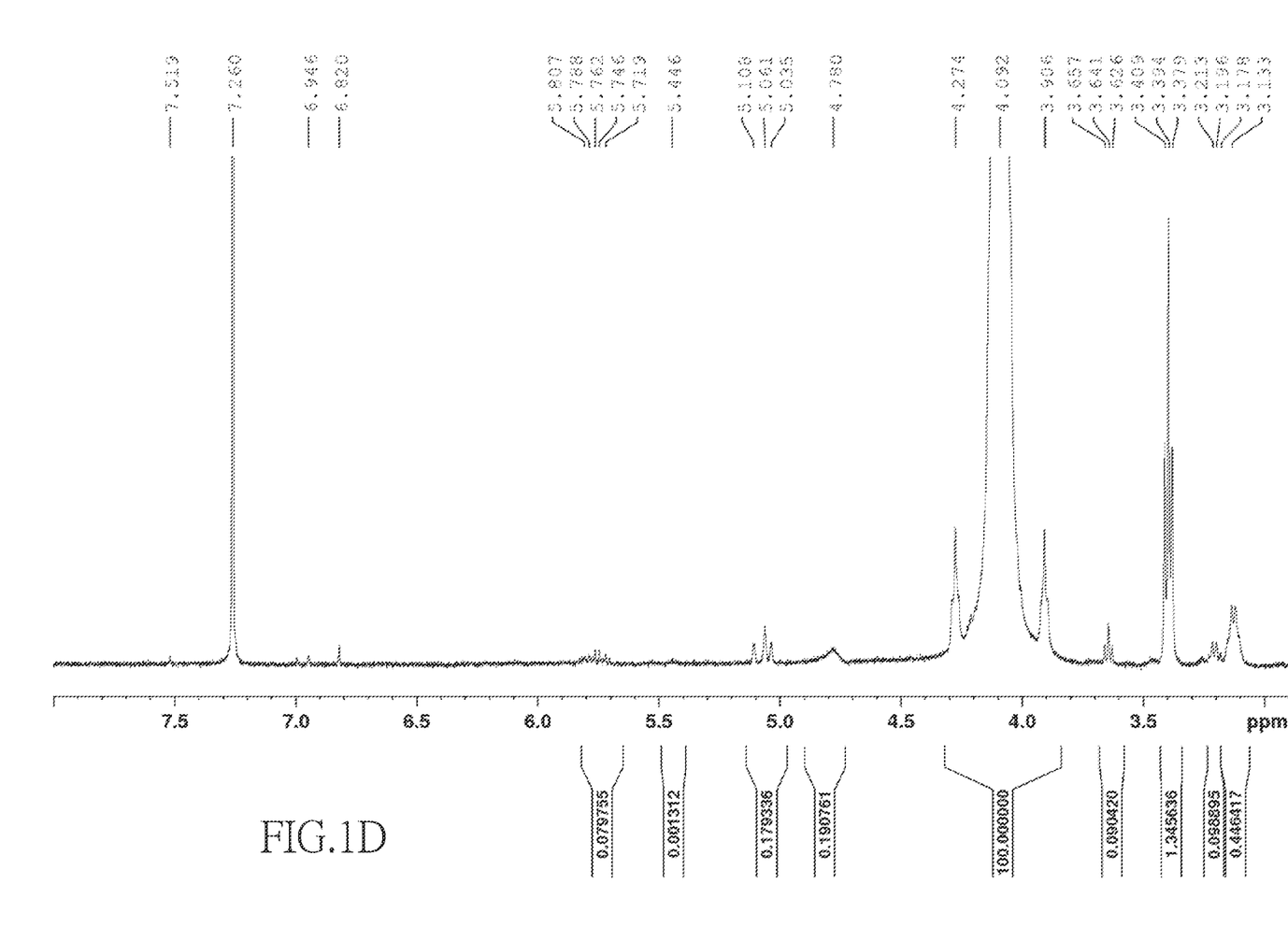
Figure 1E:
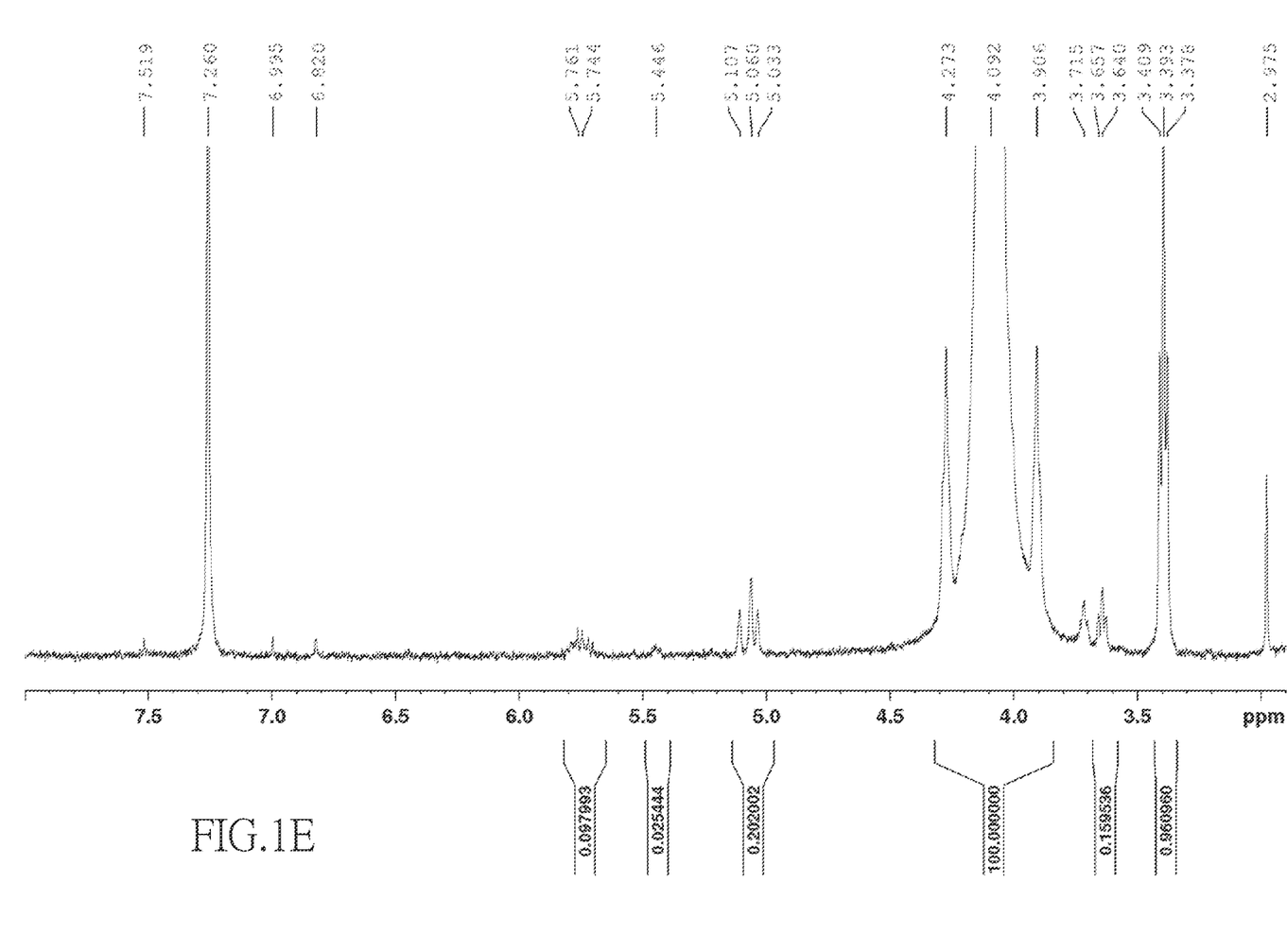
Figure 1F:
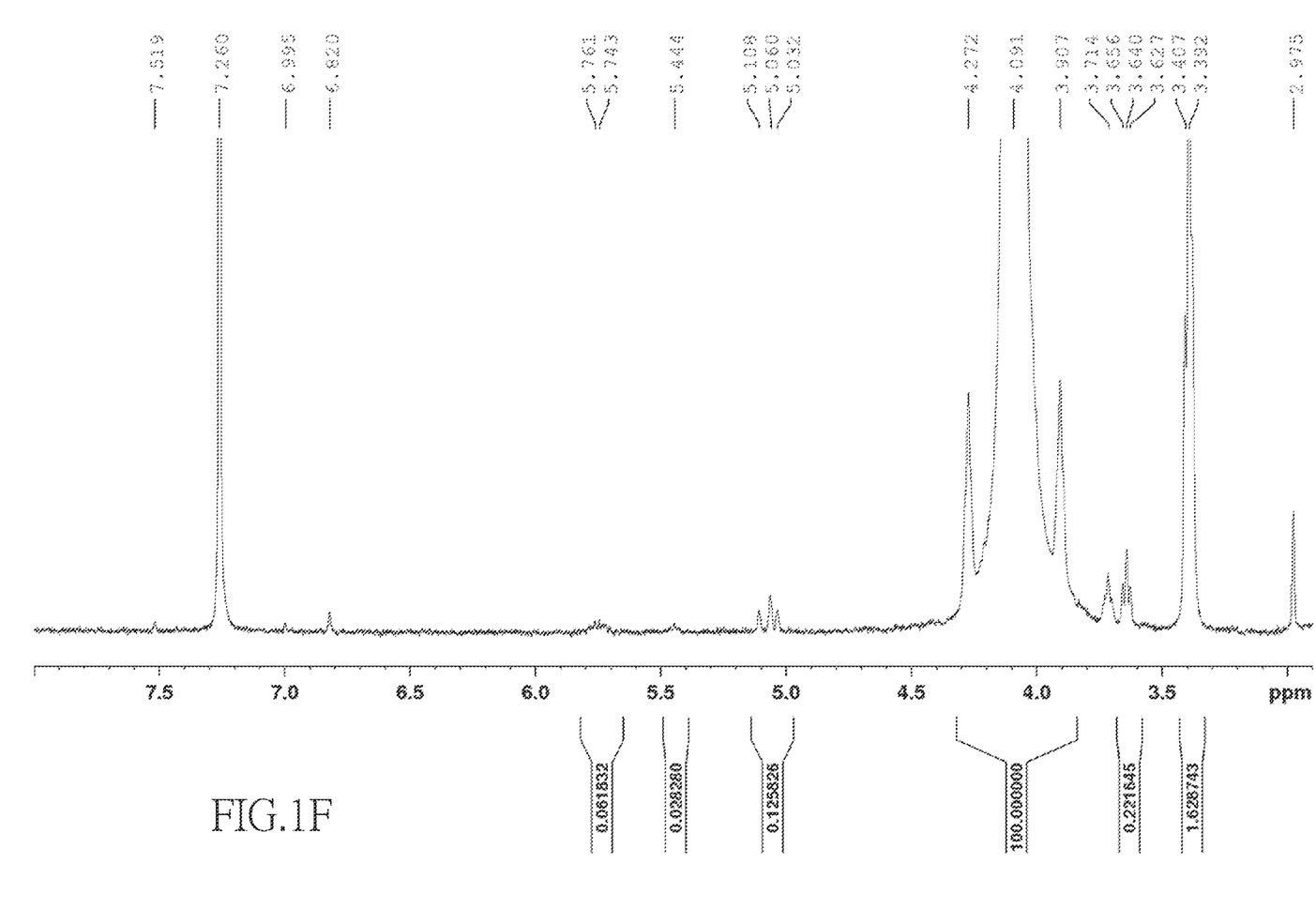
Figure 1G:
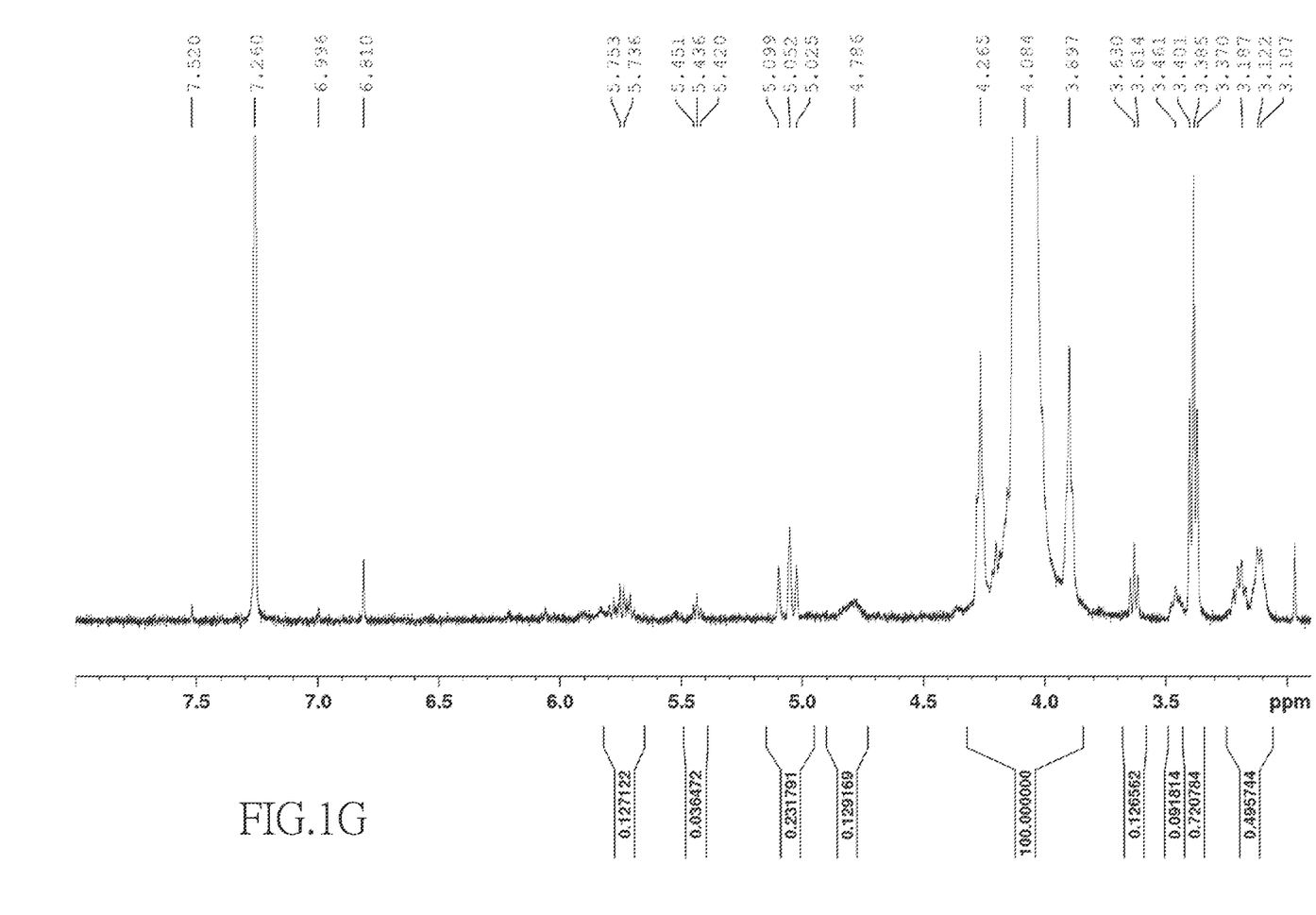

$H^1$-NMR spectra of Examples 1 to 6 and Comparative Example 1 are shown as FIG. 1A to FIG. 1G in order. The first characteristic peak located at 3.84 ppm to 4.32 ppm may correspond to the protons of the —$CH_2$— group besides the ester group in Formula (I), which is labeled as * in Formula (I). The second characteristic peak located at 5.65 ppm to 5.85 ppm may correspond to the proton of the alkene group of alkene impurity in Formula (II), which is labeled as 1 in Formula (II). The third characteristic peak located at 3.30 ppm to 3.42 ppm may correspond to the protons of the —$CH_2$— group besides the ether group in Formula (III), which is labeled as * in Formula (III). The fourth characteristic peak located at 3.55 ppm to 3.70 ppm may correspond to the protons of the —$CH_2$— group besides the hydroxy group in Formula (IV), which is labeled as * in Formula (IV). The fifth characteristic peak located at 4.72 ppm to 4.90 ppm may correspond to the proton of the amide group (—NH—CO) formed from chain extension reaction of hexamethylene diisocyanate (HDI). The sixth characteristic peak located at 4.97 ppm to 5.15 ppm may correspond to the protons of the alkene group, which is labeled as 2 in Formula (II). The chemical shift interval of each characteristic peak and the integral value of each characteristic peak after rounding are shown in Table 1.

TABLE 1 chemical shift interval and integral values of first characteristic peak to sixth characteristic peak in $H^1$-NMR spectra of aliphatic polyester compositions of Examples 1 to 6 (E1 to E6) and Comparative Example 1 (C1)

| No | $H^1$ δ (ppm) | E1 | E2 | E3 | E4 | E5 | E6 | C1 |
|---|---|---|---|---|---|---|---|---|
| 1st | 3.84-4.32 | 100 | 100 | 100 | 100 | 100 | 100 | 100 |
| 2nd | 5.65-5.85 | 0.007 | 0.024 | 0.065 | 0.080 | 0.098 | 0.062 | 0.127 |
| 3rd | 3.30-3.42 | 0.006 | 0.830 | 1.354 | 1.346 | 0.961 | 1.629 | 0.721 |
| 4th | 3.55-3.70 | 0.346 | 0.258 | 0.106 | 0.090 | 0.160 | 0.222 | 0.127 |
| 5th | 4.72-4.90 | 0.314 | 0.189 | 0.163 | 0.191 | — | — | 0.129 |
| 6th | 4.97-5.15 | 0.015 | 0.043 | 0.137 | 0.179 | 0.202 | 0.126 | 0.232 |

As shown in Table 1 and FIG. 1A to FIG. 1F, based on the integral value of the first characteristic peak as 100, the integral value of the second characteristic peak corresponding to alkene impurity was less than 0.10 in the $H^1$-NMR spectra of the aliphatic polyester compositions of Examples 1 to 6. In contrast, as shown in Table 1 and FIG. 1G, based on the integral value of the first characteristic peak as 100, the integral value of the second characteristic peak corresponding to alkene impurity was greater than 0.12 in the $H^1$-NMR spectrum of the aliphatic polyester composition of Comparative Example 1. Hence, the integral values of the first characteristic peak and the second characteristic peak in $H^1$-NMR spectra of the aliphatic polyester compositions obviously showed the difference of components in the aliphatic polyester compositions of Examples 1 to 6 and Comparative Example 1. Among them, due to aliphatic polyester composition of Comparative Example 1 having more alkene impurities, the integral value of the second characteristic peak in the aliphatic polyester composition of Comparative Example 1 was obviously higher than the integral values of the second characteristic peak in the aliphatic polyester compositions of Examples 1 to 6.

As shown in Table 1 and FIG. 1A to FIG. 1F, based on the integral value of the first characteristic peak as 100, the integral value of the third characteristic peak was 0.001 to 2.0 in $H^1$-NMR spectra of the aliphatic polyester compositions of Examples 1 to 6, the integral value of the fourth characteristic peak was 0.01 to 0.50 in $H^1$-NMR spectra of the aliphatic polyester compositions of Examples 1 to 6, the integral value of the fifth characteristic peak was 0.15 to 0.50 in $H^1$-NMR spectra of the aliphatic polyester compositions of Examples 1 to 4, and the integral value of the sixth characteristic peak was less than 0.21 in $H^1$-NMR spectra of the aliphatic polyester compositions of Examples 1 to 6.

Test Example 2: Inductively Coupled Plasma Optical Emission Spectrometry (ICP-OES)

In this test example, the aliphatic polyester compositions of Examples 1 to 6 and Comparative Example 1 were used as test samples. Inductively coupled plasma optical emission spectrometer (model: CEM-MARS 6) was used for analysis.

First, 0.2 g test sample was weighed, and a mixture of 9 mL nitric acid and 3 mL hydrochloric acid was added. Aforesaid material was sealed into a microwave digestion vessel and heated from room temperature to 210° C. in 30 minutes. The microwave digestion vessel was microwaved at aforesaid temperature for 30 minutes. Then the microwave digestion vessel was cooled to 60° C. and diluted to 30 mL by adding ultrapure water. The diluted solution was filtered by a filter paper with pore size of 11 m and thickness of 0.18 mm. The sample filtrate was yielded.

The standard solutions of sulfur, phosphorous and titanium were prepared respectively and calibration line of each element was plotted. Aforesaid sample filtrates were measured and the results were brought into aforesaid calibration line to render the contents of sulfur, phosphorous and titanium in each test sample. The results are shown in Table 2.

TABLE 2

| contents of sulfur, phosphorous and titanium of aliphatic polyester compositions of Examples 1 to 6 (E1 to E6) and Comparative Example 1 (C1) | | |
|---|---|---|
| Sulfur (ppm) | Phosphorous (ppm) | Titanium (ppm) |

| | Sulfur (ppm) | Phosphorous (ppm) | Titanium (ppm) |
|---|---|---|---|
| E1 | 9.8 | 44 | 89 |
| E2 | 33 | 2.1 | 97 |
| E3 | 56 | 22 | 29 |
| E4 | 46 | 18 | 27 |
| E5 | 63 | 2.2 | 77 |
| E6 | 77 | 3.2 | 79 |
| C1 | 168.2 | 2.7 | 101 |

As shown in Table 2, the content of sulfur of the aliphatic polyester compositions of Examples 1 to 6 was less than 100 ppm, the content of phosphorous of the aliphatic polyester compositions of Examples 1 to 6 was less than 50 ppm, and the content of titanium of the aliphatic polyester compositions of Examples 1 to 6 was 20 ppm to 100 ppm.

In contrast, the content of sulfur of the aliphatic polyester composition of Comparative Example 1 was different from the content of sulfur of the aliphatic polyester compositions of Examples 1 to 6 and the content of sulfur of the aliphatic polyester composition of Comparative Example 1 was greater than 150 ppm. The content of titanium of the aliphatic polyester composition of Comparative Example 1 was different from the content of titanium of the aliphatic polyester compositions of Examples 1 to 6 and the content of titanium of the aliphatic polyester composition of Comparative Example 1 was greater than 100 ppm.

Test Example 3: Melt Flow Index (MI)

In this test example, the aliphatic polyester compositions of Examples 1 to 6 and Comparative Example 1 were used as test samples. Melt flow indexer (model: LMI5000) was used for analysis and the analysis was conducted according to ISO 1133-1: 2011(E).

Before the test, the test sample was placed in a hot air circulating oven for 4 hours to make sure that no moisture was attached onto the test sample, wherein, the temperature of the hot air circulating oven was set to be 80±2° C. Afterwards, 4 g to 8 g of test sample was put into a 190±2° C. heating tube. After preheating, weights were added. After 10 minutes, sampling was started and aforesaid sample was then weighed. Each test sample was sampled twice. The average value thereof was yielded. The results are shown in Table 3.

Test Example 4: Concentration of Carboxylic Acid End Group (CEG)

In this test example, the aliphatic polyester compositions of Examples 1 to 6 and Comparative Example 1 were used as test samples. 725 DOSIMAT titrator (manufacturer: Metrohm) was used for analysis.

In this test example, 0.4 g to 0.6 g of test sample was placed at dry 100 mL vial and 30 mL to 50 mL of o-cresol was added. The vial was then placed on a hot plate and heated to 110±5° C. with constant stirring for 30 minutes until the test sample was dissolved completely. The sample solution was cooled to room temperature and ready for titration.

3 mL 0.01 N potassium chloride (KCl) solution was added to aforesaid sample solution and then stirred for about 1 minute. The concentration of titrating solution, blank and parameters of titration were confirmed and set in the titrator. The electrode was immersed into sample solution and the titration was started. The potentiometric titration was carried out with 0.03 N potassium hydroxide solution. The results are shown in Table 3.

Test Example 5: Color

In this test example, the aliphatic polyester compositions of Examples 1 to 6 and Comparative Example 1 were used as test samples. Colorimeter (manufacturer: hunterlab, model: CQXE) was used to analyze chromaticity b according to CIELAB color model, the reference was D65 and the observation angle was 10°. The results are shown in Table 3.

It can be understood for one person having ordinary skill in the art that the color of the aliphatic polyester composition can be defined according to the color system of the Commission Internationale de l'Eclairage (CIE). Chromaticity b denotes the relative degree of yellow and blue, the higher b value indicates that the sample is closer to yellow, and the lower b value indicates that the sample is closer to blue.

Test Example 6: Yellowness Index (YI)

In this test example, the aliphatic polyester compositions of Examples 1 to 6 and Comparative Example 1 were used as test samples. Colorimeter (manufacturer: hunterlab, model: CQXE) was used to analyze yellowness index according to CIELAB color model, the reference was D65 and the observation angle was 10°. The results are shown in Table 3.

TABLE 3 melt flow index (MI), concentration of carboxylic acid end group (CEG), chromaticity b, and yellowness index (YI) of aliphatic polyester compositions of Examples 1 to 6 (E1 to E6) and Comparative Example (C1)

| | MI (g/10 min) | CEG meq COOH/kg | Chromaticity b | YI |
|---|---|---|---|---|
| E1 | 2.7 | 17.9 | 4.57 | 7.8 |
| E2 | 4.1 | 25.99 | 11.41 | 23.3 |
| E3 | 4.17 | 26.37 | 12.91 | 28.59 |
| E4 | 28.24 | 23 | 11.08 | 22.83 |
| E5 | 35.96 | 28.35 | 8.62 | 17.48 |
| E6 | 18.05 | 24.74 | 2.77 | 4.93 |
| C1 | 4.9 | 30.8 | 16.95 | 40.6 |

As shown in Table 3, the melt flow index of the aliphatic polyester compositions of Examples 1 to 6 was less than 40 g/10 min. The concentration of carboxylic acid end group of the aliphatic polyester compositions of Examples 1 to 6 was less than 30.0 meq COOH/kg, but the concentration of carboxylic acid end group of the aliphatic polyester composition of Comparative Example 1 was greater than 30.0 meq COOH/kg.

As shown in Table 3, the chromaticity b of the aliphatic polyester compositions of Examples 1 to 6 was less than 15.0, but the chromaticity b of the aliphatic polyester composition of Comparative Example 1 was greater than 15.0. The yellowness index of the aliphatic polyester compositions of Examples 1 to 6 was less than 30.0, but the yellowness index of the aliphatic polyester composition of Comparative Example 1 was greater than 35.0. Hence, the aliphatic polyester compositions of Examples 1 to 6 had better appearance. That is, the aliphatic polyester compositions of Examples 1 to 6 had low chromaticity b and low yellowness index, which was beneficial to increasing product value thereof.

In summary, by controlling the integral value of the second characteristic peak in $H^1$-NMR spectrum of aliphatic polyester composition, the aliphatic polyester composition has good appearance and low concentration of carboxylic acid end group, which is beneficial to increasing product value thereof.

What is claimed is:

1. An aliphatic polyester composition comprising polybutylene succinate; wherein the proton nuclear magnetic resonance of the aliphatic polyester composition has a first characteristic peak and a second characteristic peak, the first characteristic peak is at 3.84 ppm to 4.32 ppm, the second characteristic peak is at 5.65 ppm to 5.85 ppm, and the integral value of the second characteristic peak is less than 0.10 based on the integral value of the first characteristic peak as 100.

2. The aliphatic polyester composition as claimed in claim 1, wherein the proton nuclear magnetic resonance of the aliphatic polyester composition has a third characteristic peak, the third characteristic peak is at 3.30 ppm to 3.42 ppm, and the integral value of the third characteristic peak is 0.001 to 2.0 based on the integral value of the first characteristic peak as 100.

3. The aliphatic polyester composition as claimed in claim 1, wherein the proton nuclear magnetic resonance of the aliphatic polyester composition has a fourth characteristic peak, the fourth characteristic peak is at 3.55 ppm to 3.70 ppm, and the integral value of the fourth characteristic peak is 0.01 to 0.50 based on the integral value of the first characteristic peak as 100.

4. The aliphatic polyester composition as claimed in claim 1, wherein the proton nuclear magnetic resonance of the aliphatic polyester composition has a fifth characteristic peak, the fifth characteristic peak is at 4.72 ppm to 4.90 ppm, and the integral value of the fifth characteristic peak is 0.15 to 0.50 based on the integral value of the first characteristic peak as 100.

5. The aliphatic polyester composition as claimed in claim 1, wherein the proton nuclear magnetic resonance of the aliphatic polyester composition has a sixth characteristic peak, the sixth characteristic peak is at 4.97 ppm to 5.15 ppm, and the integral value of the sixth characteristic peak is less than 0.21 based on the integral value of the first characteristic peak as 100.

6. The aliphatic polyester composition as claimed in claim 1, wherein the content of sulfur of the aliphatic polyester composition is less than 100 ppm.

7. The aliphatic polyester composition as claimed in claim 1, wherein the content of phosphorous of the aliphatic polyester composition is less than 50 ppm.

8. The aliphatic polyester composition as claimed in claim 1, wherein the content of titanium of the aliphatic polyester composition is 20 ppm to 100 ppm.

9. The aliphatic polyester composition as claimed in claim 1, wherein the melt flow index of the aliphatic polyester composition is less than 40.0 g/10 min.

10. The aliphatic polyester composition as claimed in claim 6, wherein the melt flow index of the aliphatic polyester composition is less than 40.0 g/10 min.

11. The aliphatic polyester composition as claimed in claim 7, wherein the melt flow index of the aliphatic polyester composition is less than 40.0 g/10 min.

12. The aliphatic polyester composition as claimed in claim 1, wherein the concentration of carboxylic acid end group of the aliphatic polyester composition is less than 30.0 meq COOH/kg.

13. The aliphatic polyester composition as claimed in claim 6, wherein the concentration of carboxylic acid end group of the aliphatic polyester composition is less than 30.0 meq COOH/kg.

14. The aliphatic polyester composition as claimed in claim 7, wherein the concentration of carboxylic acid end group of the aliphatic polyester composition is less than 30.0 meq COOH/kg.

15. The aliphatic polyester composition as claimed in claim 1, wherein the chromaticity b of the aliphatic polyester composition is less than 15.0.

16. The aliphatic polyester composition as claimed in claim 6, wherein the chromaticity b of the aliphatic polyester composition is less than 15.0.

17. The aliphatic polyester composition as claimed in claim 7, wherein the chromaticity b of the aliphatic polyester composition is less than 15.0.

18. The aliphatic polyester composition as claimed in claim 1, wherein the yellowness index of the aliphatic polyester composition is less than 30.0.

19. The aliphatic polyester composition as claimed in claim 6, wherein the yellowness index of the aliphatic polyester composition is less than 30.0.

20. The aliphatic polyester composition as claimed in claim 7, wherein the yellowness index of the aliphatic polyester composition is less than 30.0.

* * * * *